United States Patent [19]
Lopez

[11] 3,743,467
[45] July 3, 1973

[54] MOLD ASSEMBLY TO FORM A CONTAINER

[76] Inventor: Arnelson Norvaldo Lopez, Avellaneda Calle Lavalle No. 301, Buenos Aires, Argentina

[22] Filed: Mar. 1, 1971

[21] Appl. No.: 119,542

[30] Foreign Application Priority Data
Feb. 19, 1970  Argentina .......................... 227047

[52] U.S. Cl. ............... 425/387, 425/326, 264/94
[51] Int. Cl. .............................................. B29c 5/06
[58] Field of Search .................... 425/326 B, 387 B, 425/468; 249/175

[56] References Cited
UNITED STATES PATENTS

| | | | |
|---|---|---|---|
| 1,337,618 | 4/1920 | Pipe | 425/468 |
| 2,331,630 | 10/1943 | Rempel | 425/387 B |
| 3,058,153 | 10/1962 | Busch | 425/468 X |
| 3,507,942 | 4/1970 | Lynch | 425/326 B X |
| 3,534,435 | 10/1970 | John | 425/387 B |
| 3,538,543 | 11/1970 | Nataf | 425/326 B X |

Primary Examiner—R. Spencer Annear
Attorney—Lerner, David & Littenberg

[57] ABSTRACT

A mold assembly is provided for forming a container with an inner channel in the wall of the container, which assembly includes a mold having an interior molding cavity and a passageway passing through at least one walled surface thereof, and an elongated core removably positioned in the passageway with a portion thereof extending into the interior molding cavity.

4 Claims, 4 Drawing Figures

PATENTED JUL 3 1973

3,743,467

INVENTOR
ARNELSON N. LOPEZ
BY
LERNER, DAVID & LITTENBERG
ATTORNEYS

MOLD ASSEMBLY TO FORM A CONTAINER

FIELD OF THE INVENTION

The present invention relates to the manufacture of containers provided with an internal tubular channel in the wall thereof, and more specifically relates to an assembly and method for simultaneously forming such a container with an inner channel in a wall thereof.

BACKGROUND OF THE INVENTION

In many situations it is desirable to have a container which includes an inner channel in a wall thereof. For example in U.S. Patent application Ser. No. 63,502 entitled "NURSING BOTTLE FORMED BY A HOUSING AND A RUBBER NIPPLE" in the name of the instant inventor, there is disclosed a nursing bottle which includes a thermometer positioned in an internal channel provided in the wall of the container. In other applications, generally in the scientific field, it is desirable to use such internal channelways in containers for the reception of physical, chemical or mechanical additives which may or may not be used in conjunction with the materials stored in the container per se. Until the present invention, there existed no simple assembly or method employing such assembly for automatically and simultaneously forming such a container with an inner channel in the wall thereof.

SUMMARY OF THE INVENTION

As suggested above, the instant invention relates to an assembly and method employing such assembly for simultaneously forming a container with an inner channel in the wall thereof. Briefly speaking, the manufacturing assembly of the instant invention includes a mold, having an internal molding cavity therein and a passageway passing through at least one walled surface thereof, and an elongated core removably positioned in the passageway with a portion thereof extending into the interior molding cavity adjacent a second walled portion thereof. In practicing the method of the invention, the above-described mold is formed; the elongated core is inserted into the cavity to a depth corresponding to the length of the internal channel it is desirable to form; the molding material is expanded from within the cavity into surface contact with the walls of the mold and also takes the form dictated by the elongated core. After the mold is allowed to set, the core is removed, and the container thus formed with an internal channel is removed from the mold.

Accordingly it is an object of the instant invention to provide a manufacturing assembly for simultaneously forming a container with an inner channel in the wall thereof.

Another object of the instant invention is to provide a method for simultaneously producing a container with an inner channel in the wall thereof.

Other objects and a fuller understanding of the instant invention may be had by referring to the following description and drawings in which.

Figure 1:
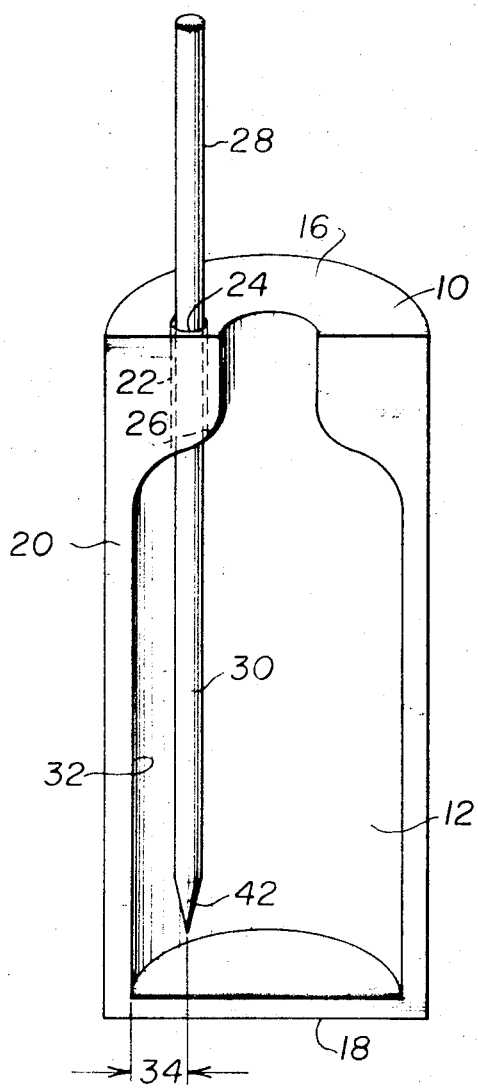
FIG. 1 is a front perspective view of one half of a mold employed in the instant invention and also showing the core of the instant invention positioned with respect to the mold.

Turning to the Figures, in FIG. 1 there is shown a generally semi-cylindrical mold half 10 constructed of any suitable strong material, preferably metal. Mold half 10 includes in the interior thereof one half of a molding cavity 12 having a preselected shape corresponding to the desired shape for the finished molded product. It will be understood, as is customary in the molding industry, that a second mold half 14 (shown only in FIGS. 2 and 3) is provided and includes a corresponding second half of the interior molding cavity 12. Of course, during the molding process, the two mold halves 10 and 14 are held together by suitable fastening means or an appropriate jig such that during the molding process, the mold can be said to be of generally cylindrical construction having a top wall 16 (only one half of which is shown on the mold half 10 of FIG. 1), a bottom wall 18 (only one half of which is suggested on the mold half 10 of FIG. 1), a side wall 20 (whose cross sectional configuration is suggested on the mold half 10 of FIG. 1), and an interior molding cavity 12 provided therein.

Provided in the upper wall 16 is an elongated passageway 22 one end 24 of which communicates with the exterior of the mold 10 and the other end 26 which communicates with the interior molding cavity 12. Removably positioned in the passageway 22 is a cylindrical core 28, preferably of metal, having a portion 30 of which extends through the passageway 22 and into the molding cavity 12 adjacent the innersurface 32 of the side wall 20. The radial location of the passageway 22 with respect to the center of the mold is such that the portion 30 of the core 28 will be closely spaced from the interior surface 32 and preferably by a distance corresponding to the thickness of the wall of the container to be molded in the interior molding cavity of the mold. This distance is represented by the dimension 34 in FIG. 1 and as can be seen in FIG. 4, corresponds to the thickness dimension 34' of the wall 36 of the finished container 38.

Figure 4:
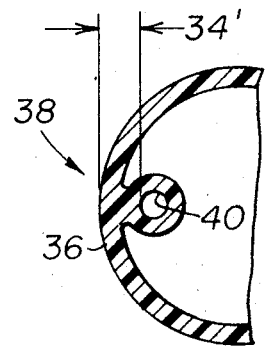
FIG. 4 is a cross sectional view of a portion of the container formed by the instant invention.

In carrying out the method of the instant invention, the mold is first formed and the core 28 is inserted to a depth to correspond to the desired length of the internal channel 40 formed in the wall of the container 38 (FIG. 4). To facilitate the insertion of the core 28, the inner end 42 is pointed. Also, the core may be waxed to facilitate insertion through the passageway 22.

Figure 2:
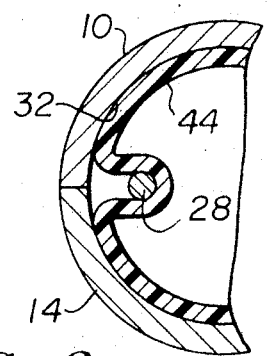
FIG. 2 is a cross-sectional view of the mold of the instant invention and further illustrating the displacement of molding material therein.
Figure 3:
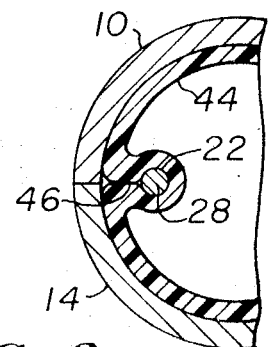
FIG. 3 is a cross sectional view of the mold of the instant invention and further illustrating the expansion of the molding material therein.

Thereafter, the molding material, (glass, plastic, etc.), is expanded from within the cavity 12, preferably by a blowing technique, and into surface engagement with the interior surfaces of the mold. This is illustrated in FIG. 2 wherein the expanded molding material 44 is seen to be taking the shape of the interior surface 32 of the mold and also taking the form of the core 28. In FIG. 3, the molding material 44 is seen to further expand much like "twin branches" behind the core 28 and meet at a line designated 46. It should be pointed out that for the sake of the drawing clarity, the diameter of the passageway 22 has been enlarged with respect to the diameter of the core 28. In reality, the core 28 is virtually the same diameter as the passageway 22.

Thereafter, the molding material is allowed to set, or cure (depending on the material being employed) after which time, the core 28 is removed. Finally, the core halves 10 and 14 are separated and the finished container 38 removed therefrom. As can be seen in FIG. 4, the resultant container has an internal channelway 40 in the wall thereof.

Thus there has been described a manufacturing assembly and method employing same for simultaneously producing a container which has an internal channelway in the wall thereof.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

I claim:

1. An assembly for simultaneously forming a container with an inner channel in the wall of the container; said assembly comprising;

a mold, said mold having an interior molding cavity therein, and said mold being of generally cylindrical shape having top and bottom walls and a cylindrical side wall;

said mold having a passageway extending through one of said top or bottom wall, one end communicating with the exterior of said mold and the other end of said passageway communicating with said interior molding cavity away from said cylindrical wall, an elongated core removably positioned in said passageway with a portion thereof extending into said interior molding cavity adjacent said cylindrical side wall and extending substantially the entire length of said cylindrical side wall for forming said inner channel.

2. The assembly of claim 1 wherein said mold is formed of two semi-cylindrical half portions removably joined to one another.

3. The assembly of claim 1 wherein said passageway is located at a predetermined position in said one walled portion such that said portion of said core will be spaced from the interior surface of said second walled portion by a distance corresponding to the thickness of the wall of the container to be molded in the interior molding cavity of said mold.

4. The assembly of claim 1 wherein one end of said core is pointed to facilitate the insertion and removal of said core from said passageway.

* * * * *